United States Patent
Kim et al.

(10) Patent No.: US 10,787,257 B2
(45) Date of Patent: Sep. 29, 2020

(54) UNMANNED AIRCRAFT AND METHOD OF CONTROLLING THE SAME

(71) Applicant: LG ELECTRONICS INC., Seoul (KR)

(72) Inventors: Jungsik Kim, Seoul (KR); Jaehark Park, Seoul (KR); Woosok Chang, Seoul (KR); Taegil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 15/753,655

(22) PCT Filed: Nov. 17, 2015

(86) PCT No.: PCT/KR2015/012325
§ 371 (c)(1),
(2) Date: Feb. 20, 2018

(87) PCT Pub. No.: WO2017/030243
PCT Pub. Date: Feb. 23, 2017

(65) Prior Publication Data
US 2018/0244385 A1  Aug. 30, 2018

(30) Foreign Application Priority Data

Aug. 20, 2015  (KR) .......... 10-2015-0117551

(51) Int. Cl.
*B64C 39/02* (2006.01)
*G05D 1/08* (2006.01)
(Continued)

(52) U.S. Cl.
CPC ......... *B64C 39/024* (2013.01); *G05D 1/0033* (2013.01); *G05D 1/085* (2013.01);
(Continued)

(58) Field of Classification Search
CPC ............ B64C 39/024; B64C 2201/141; B64C 2201/143; B64C 2201/145;
(Continued)

(56) References Cited

U.S. PATENT DOCUMENTS 6,848,314 B2 *  3/2005  Frink ................. B64C 39/024
701/3
6,955,324 B2 * 10/2005  Tanielian .......... B64C 39/024
244/3.13
(Continued)

FOREIGN PATENT DOCUMENTS

JP         3170759 B2    5/2001
WO    WO 2014/075609 A1    5/2014

*Primary Examiner* — Dale W Hilgendorf
(74) *Attorney, Agent, or Firm* — Birch, Stewart, Kolasch & Birch, LLP

(57) ABSTRACT

Disclosed is an unmanned aircraft including: a housing; a drive unit that is formed in such a manner that the housing is moved; multiple UWB communication modules that are arranged a distance away from one another and that receives a wireless signal from an external device; a sensor unit that detects movement of the housing; and a control unit that calculates a distance between the external device and the housing, using pieces of movement information which are output by the multiple UWB communication modules and the sensor unit, and that controls the drive unit in such a manner that a specific distance between the external device and the housing is maintained.

14 Claims, 18 Drawing Sheets

(51) Int. Cl.
 *G05D 1/10* (2006.01)
 *G05D 1/00* (2006.01)
(52) U.S. Cl.
 CPC ........ *G05D 1/106* (2019.05); *B64C 2201/027* (2013.01); *B64C 2201/127* (2013.01); *B64C 2201/141* (2013.01); *B64C 2201/143* (2013.01); *B64C 2201/145* (2013.01)
(58) Field of Classification Search
 CPC ........ B64C 2201/027; B64C 2201/127; G05D 1/085; G05D 1/106; G05D 1/0033
 See application file for complete search history.

(56) References Cited

U.S. PATENT DOCUMENTS

| | | |
|---|---|---|
| 7,962,150 B2 | 6/2011 | Hertzog et al. |
| 8,213,957 B2 | 7/2012 | Bull et al. |
| 9,016,617 B2 | 4/2015 | Wang et al. |
| 9,056,676 B1* | 6/2015 | Wang .................... B64C 39/024 |
| 2008/0125920 A1 | 5/2008 | Miles et al. |
| 2010/0250022 A1* | 9/2010 | Hines et al. ...... B64C 2201/141 |
| | | 701/2 |
| 2013/0173088 A1* | 7/2013 | Callou et al. ......... B64C 39/024 |
| | | 701/2 |
| 2014/0032021 A1* | 1/2014 | Metzler et al. ....... B64C 39/024 |
| | | 701/3 |
| 2015/0134143 A1 | 5/2015 | Willenborg |
| 2015/0370250 A1* | 12/2015 | Bachrach et al. .... B64C 39/024 |
| | | 701/2 |
| 2017/0127652 A1* | 5/2017 | Shen et al. ............ B64C 39/024 |
| 2017/0225680 A1* | 8/2017 | Huang et al. ......... B64C 39/024 |

* cited by examiner

[Fig. 1a]
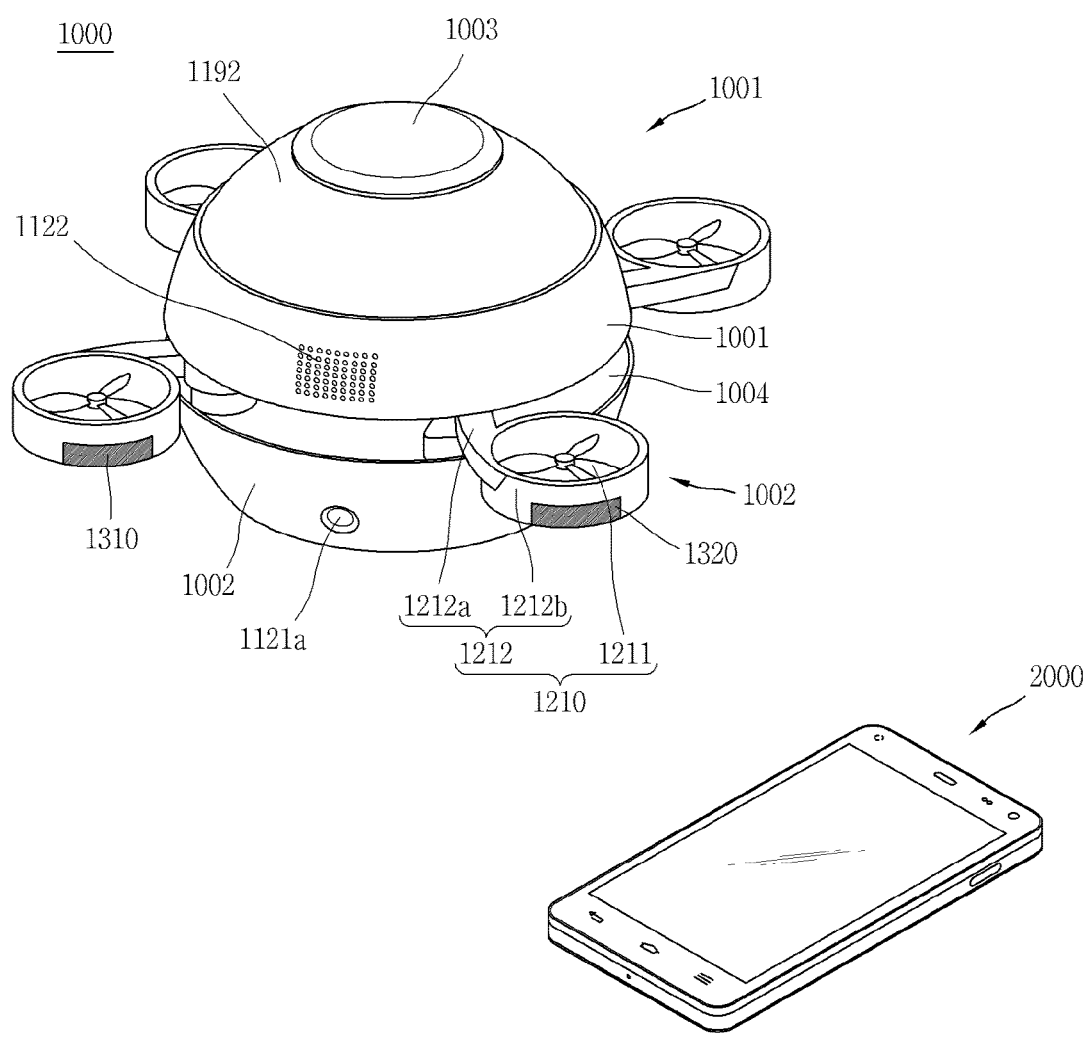

[Fig. 1b]
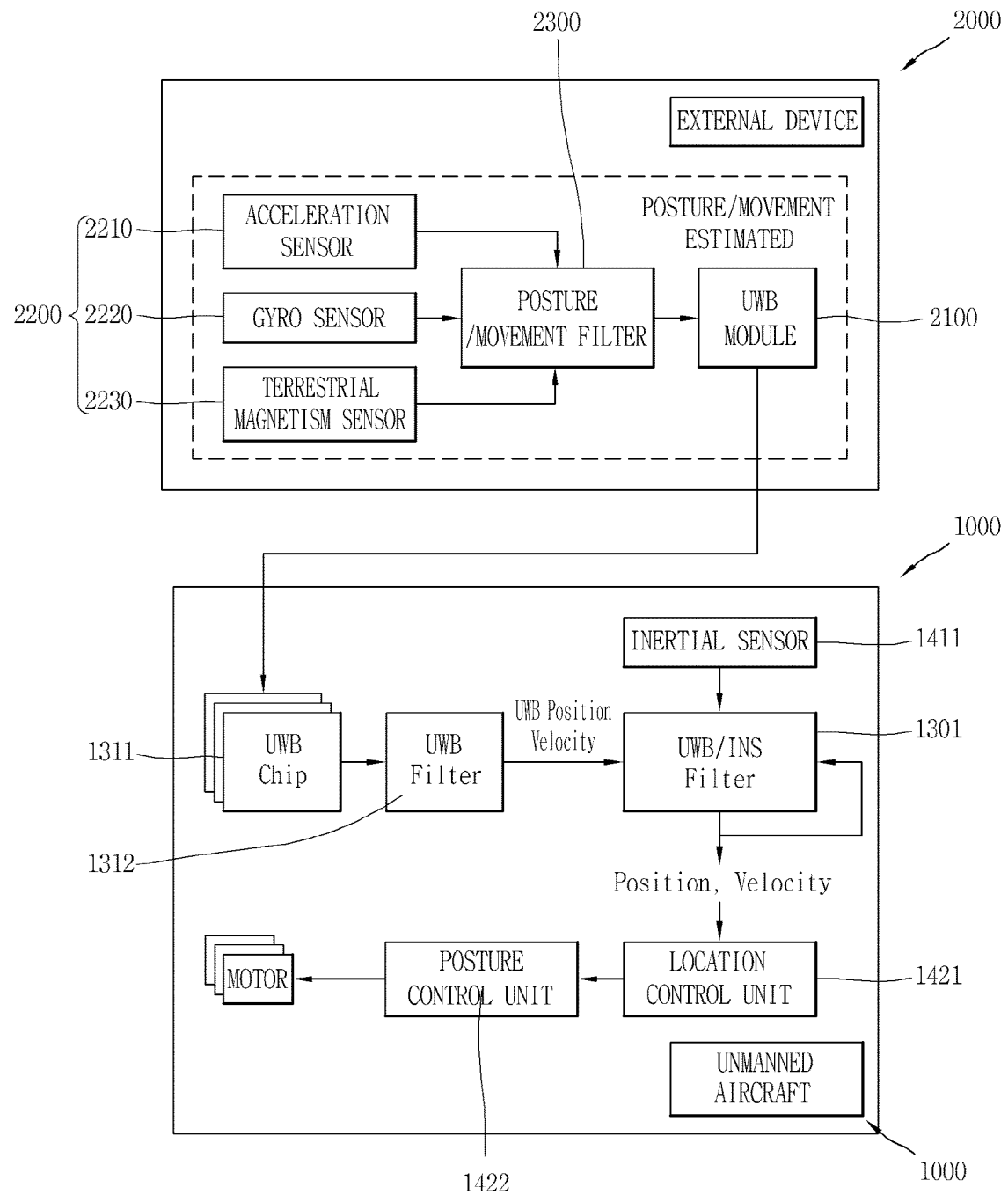

[Fig. 1c]
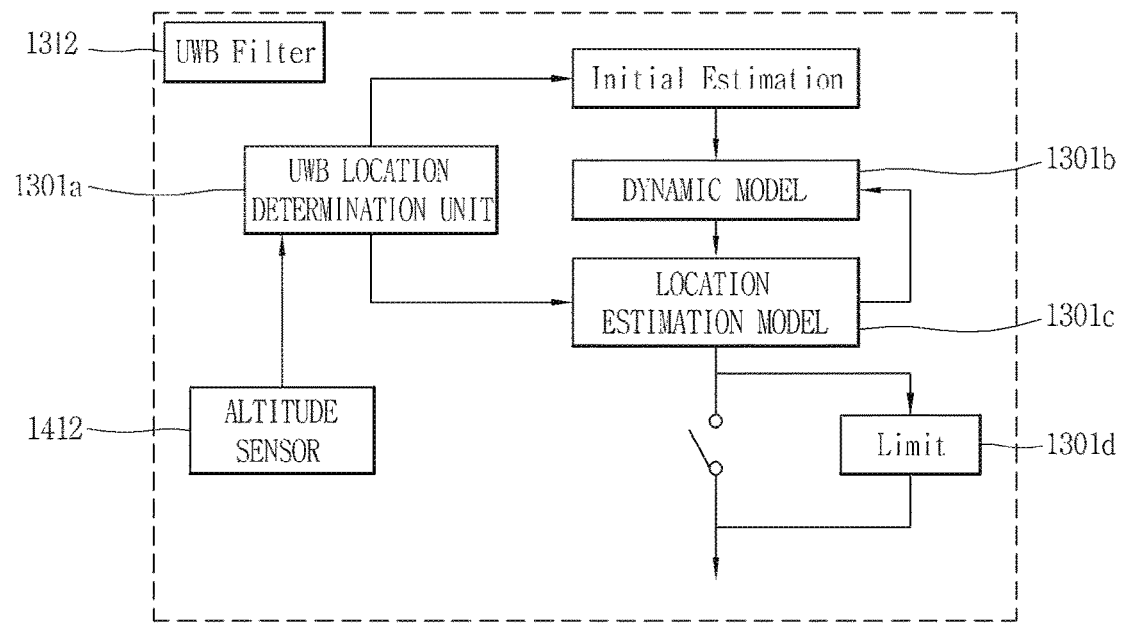
[Fig. 2a]
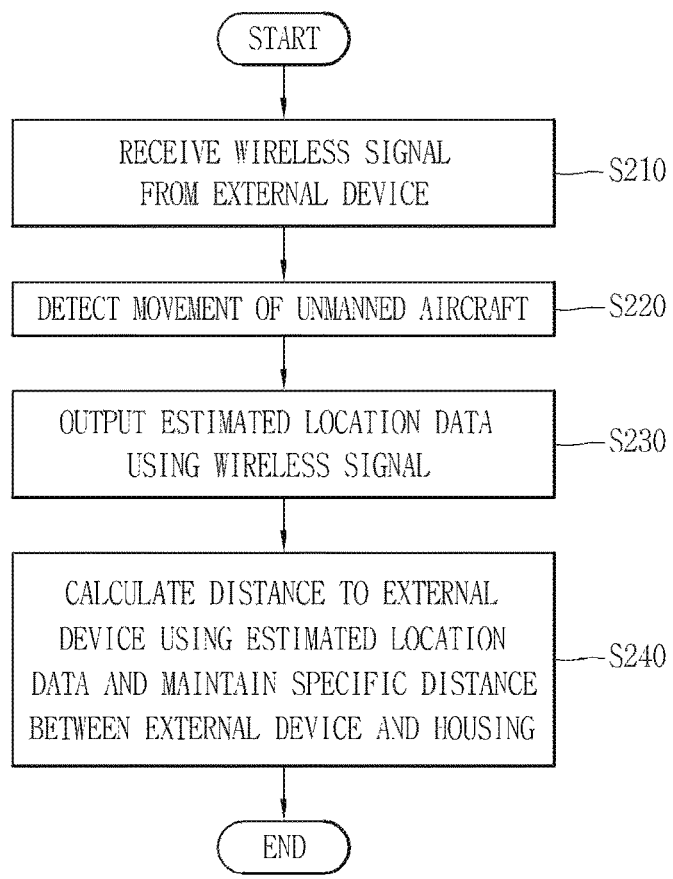

[Fig. 2b]
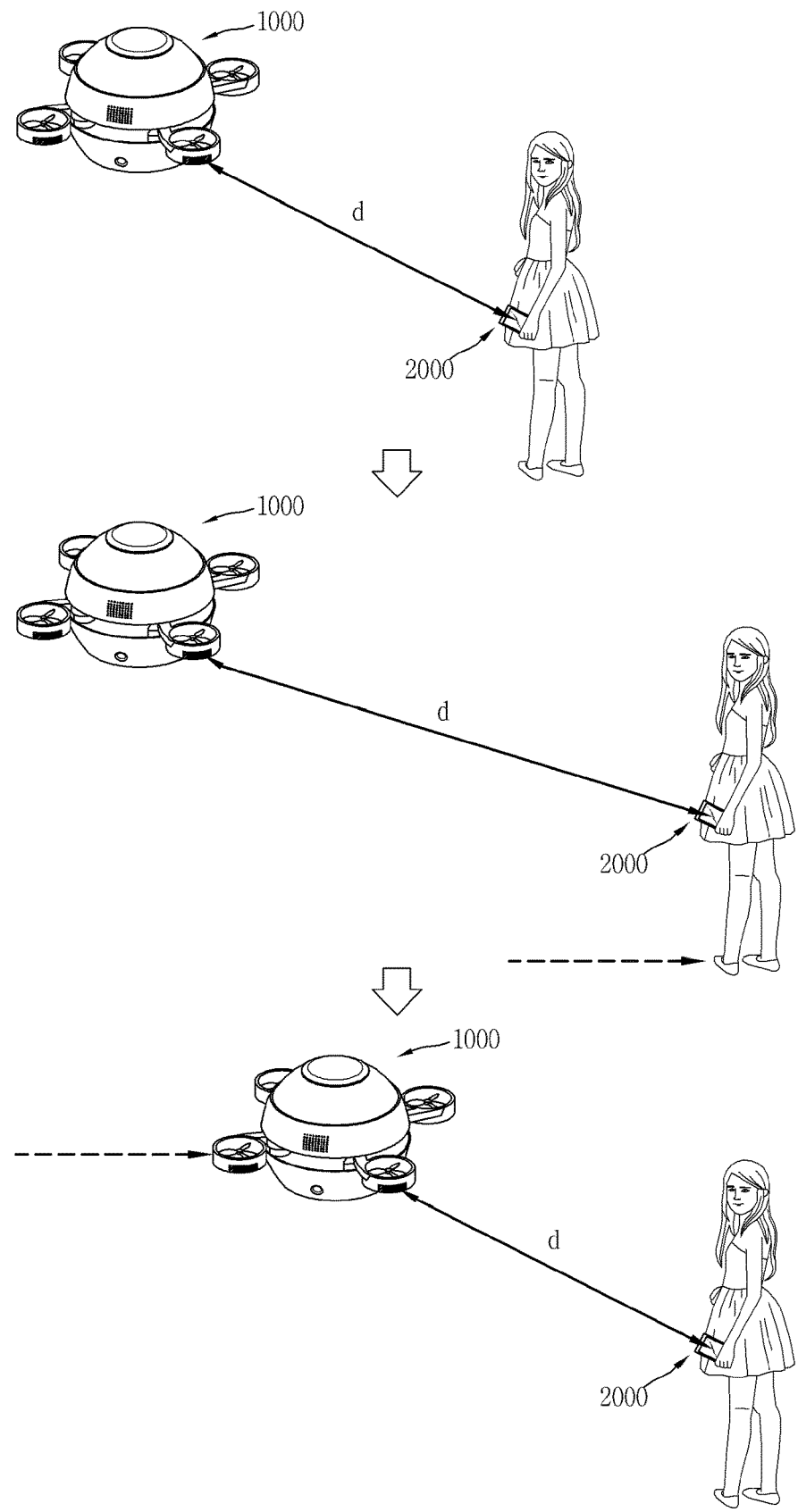

[Fig. 2c]
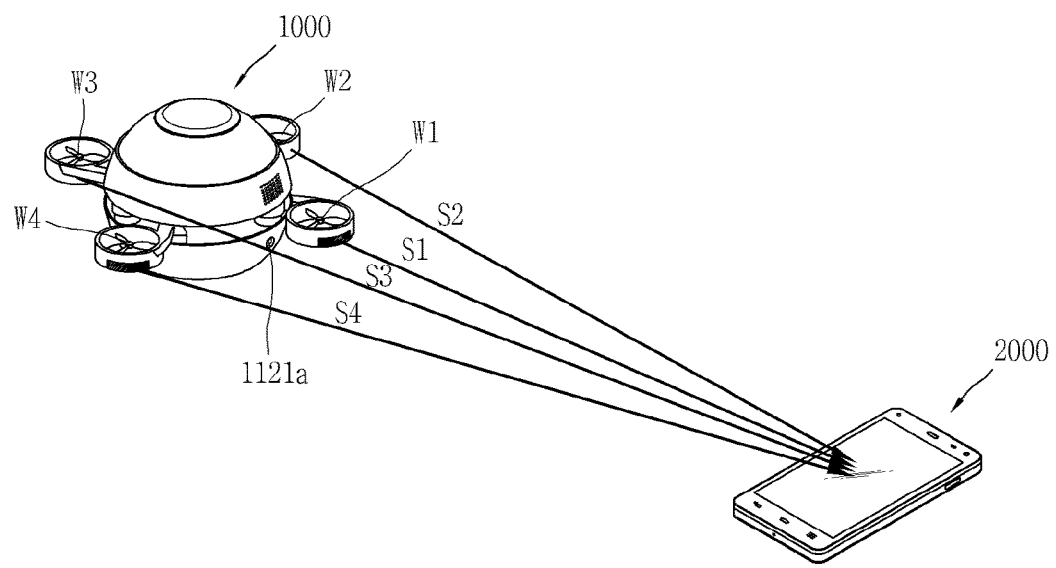
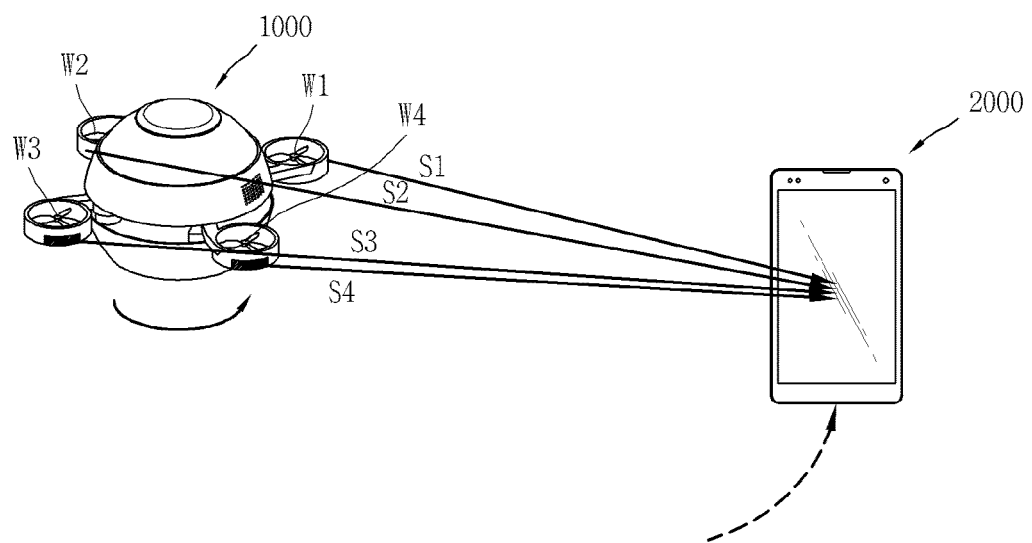

[Fig. 3a]
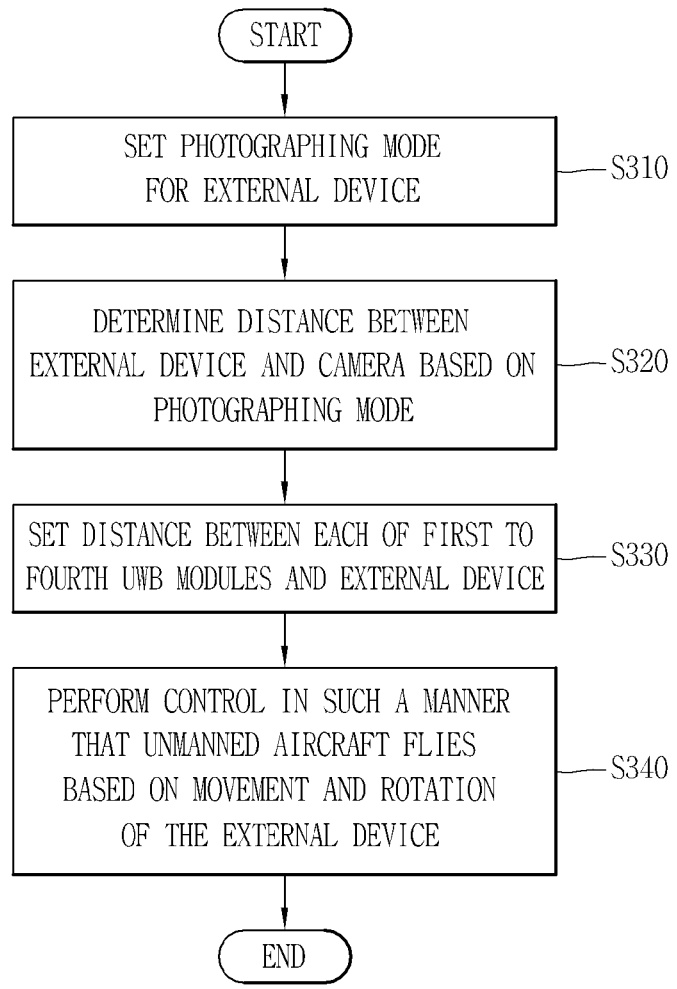

[Fig. 3b]
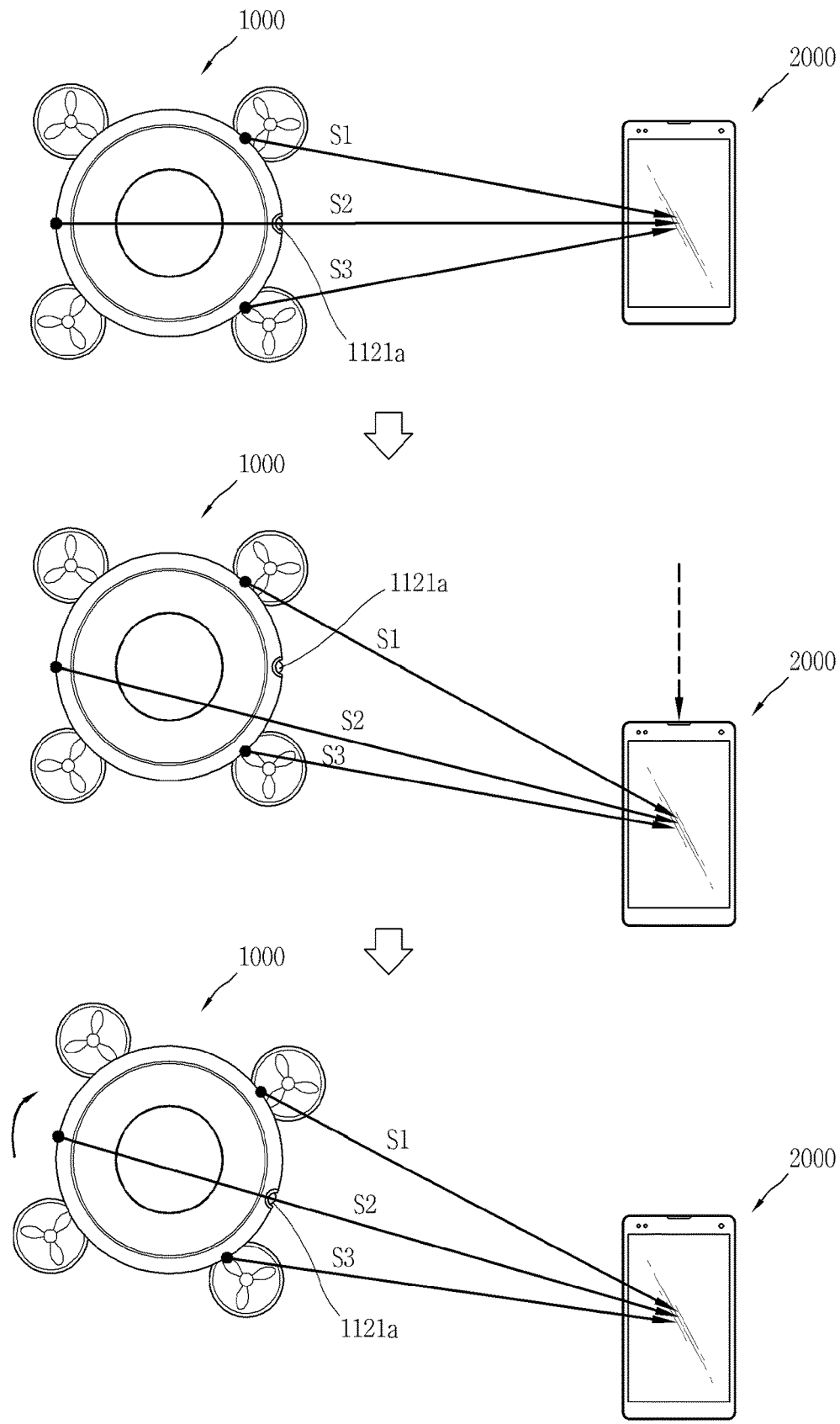

[Fig. 4a]
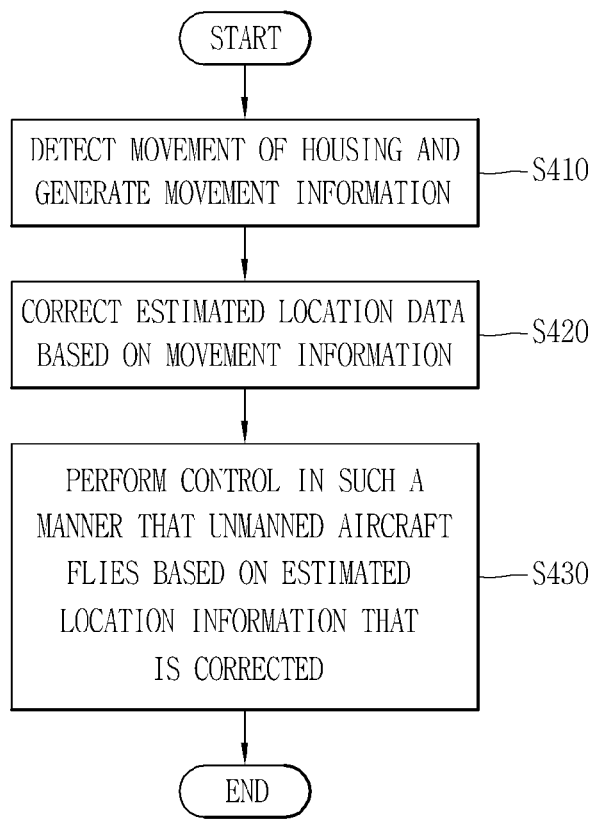

[Fig. 4c]
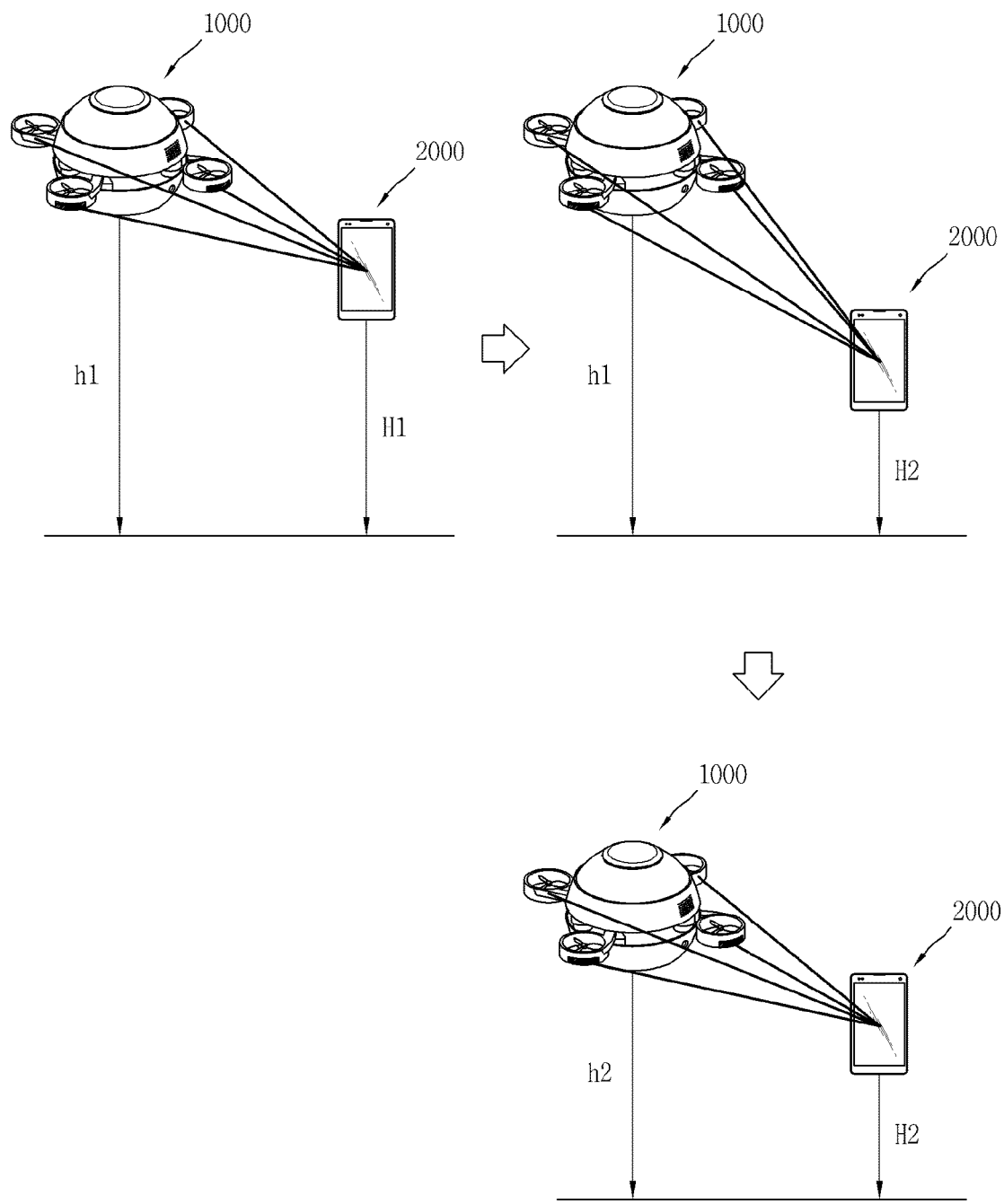

[Fig. 5a]
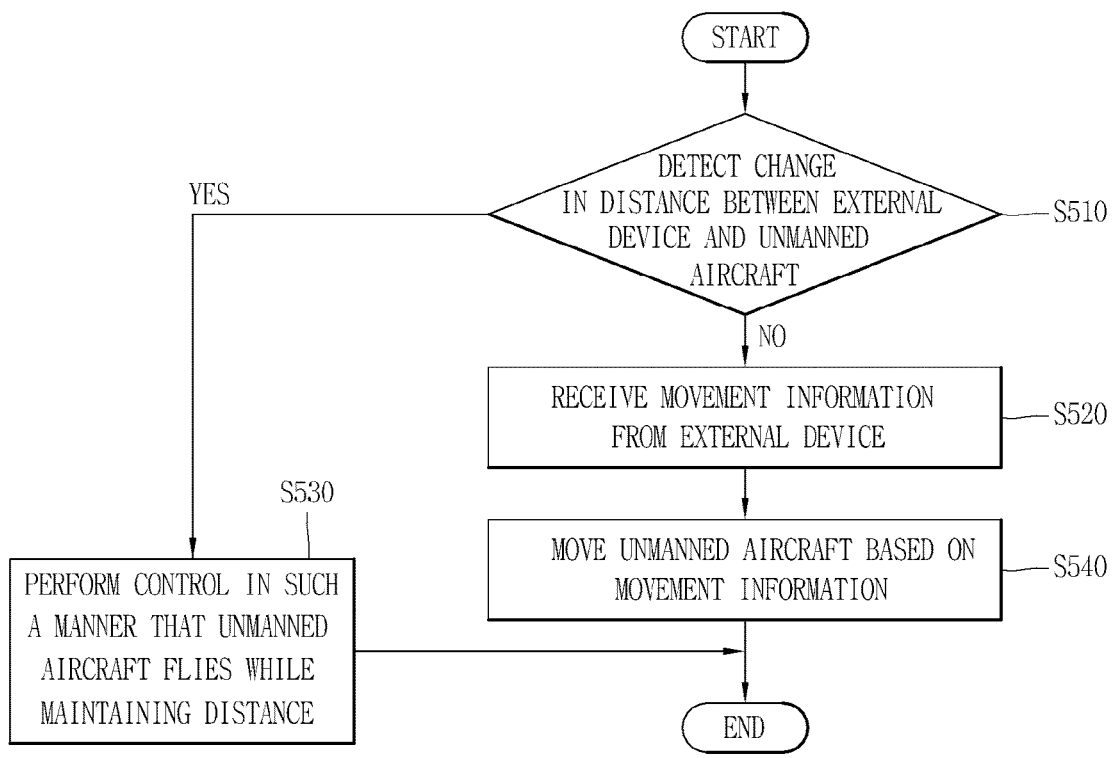

[Fig. 5b]
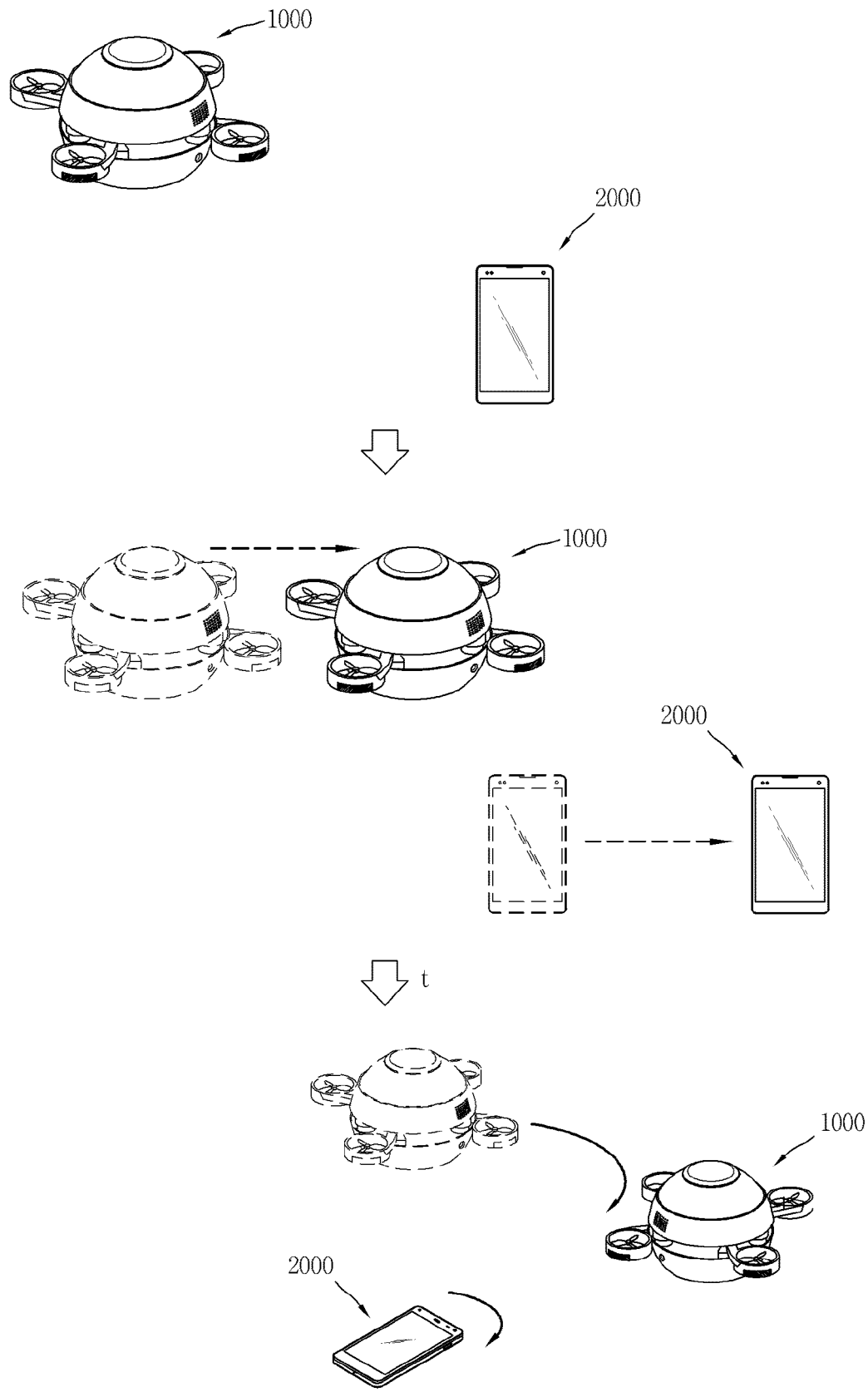

[Fig. 5c]
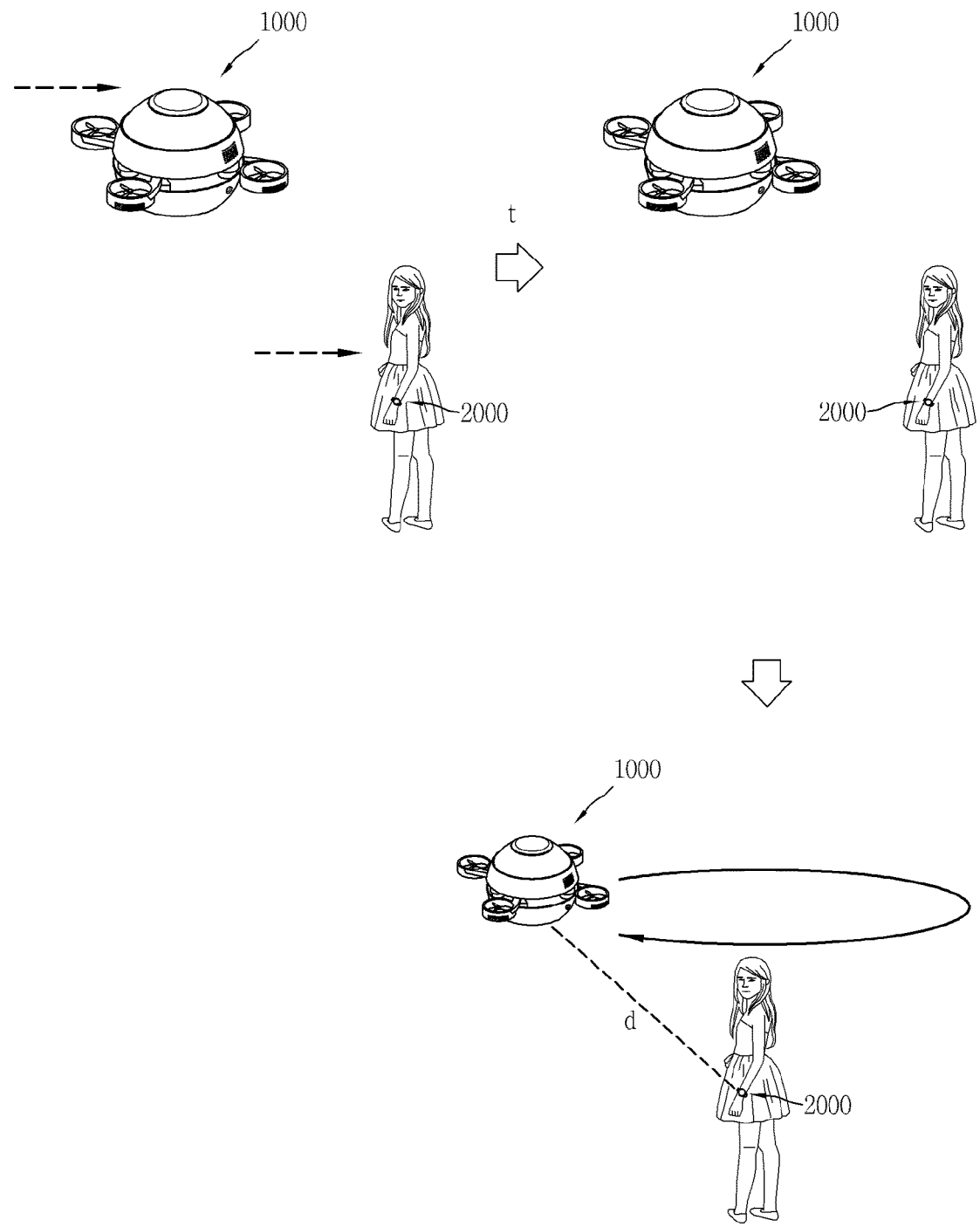

[Fig. 5d]
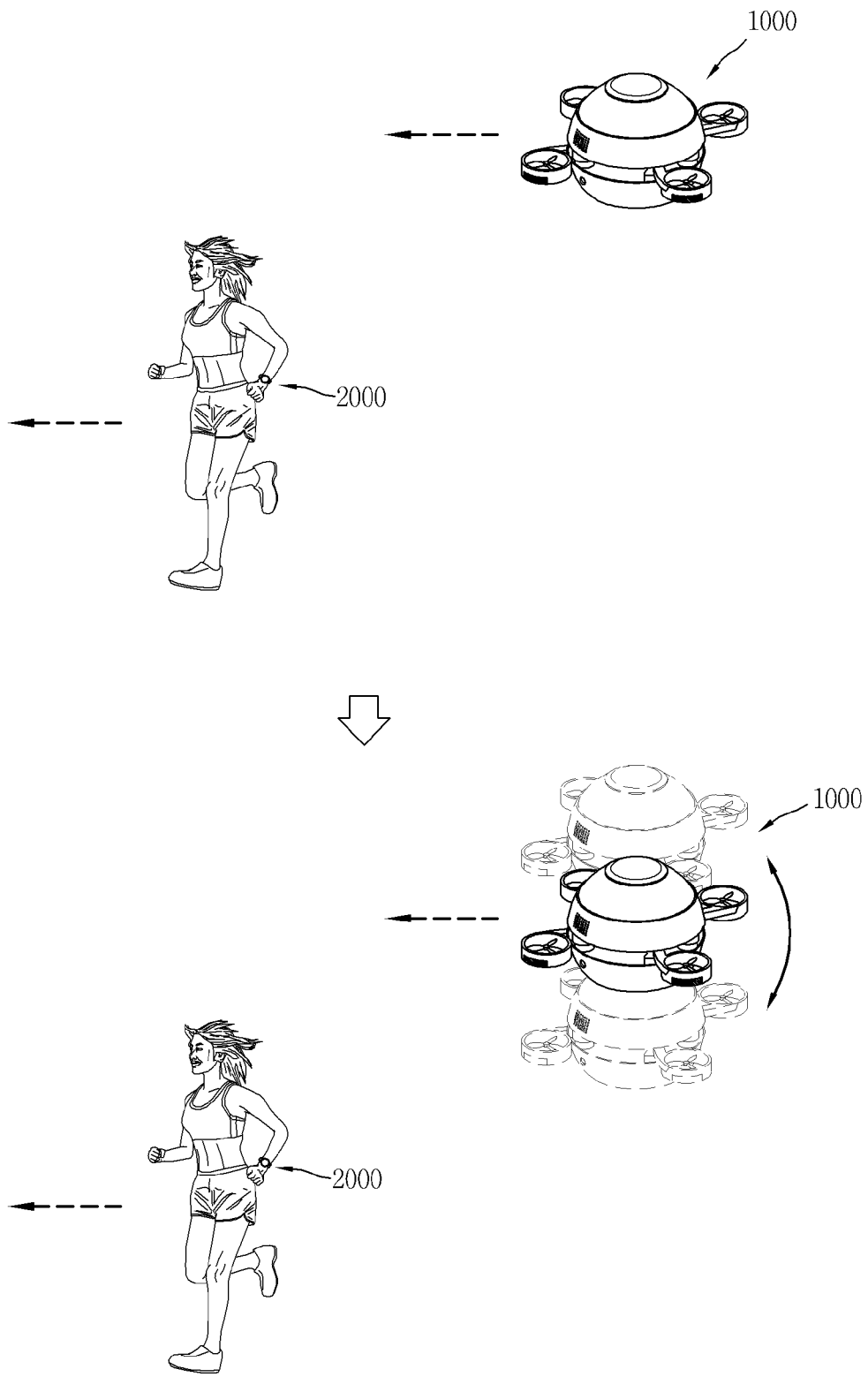

[Fig. 6a]
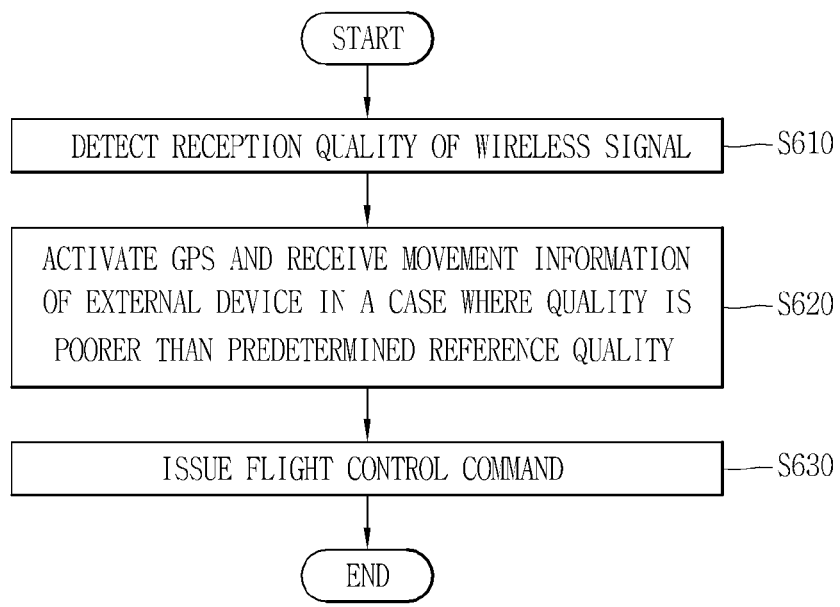

[Fig. 6b]
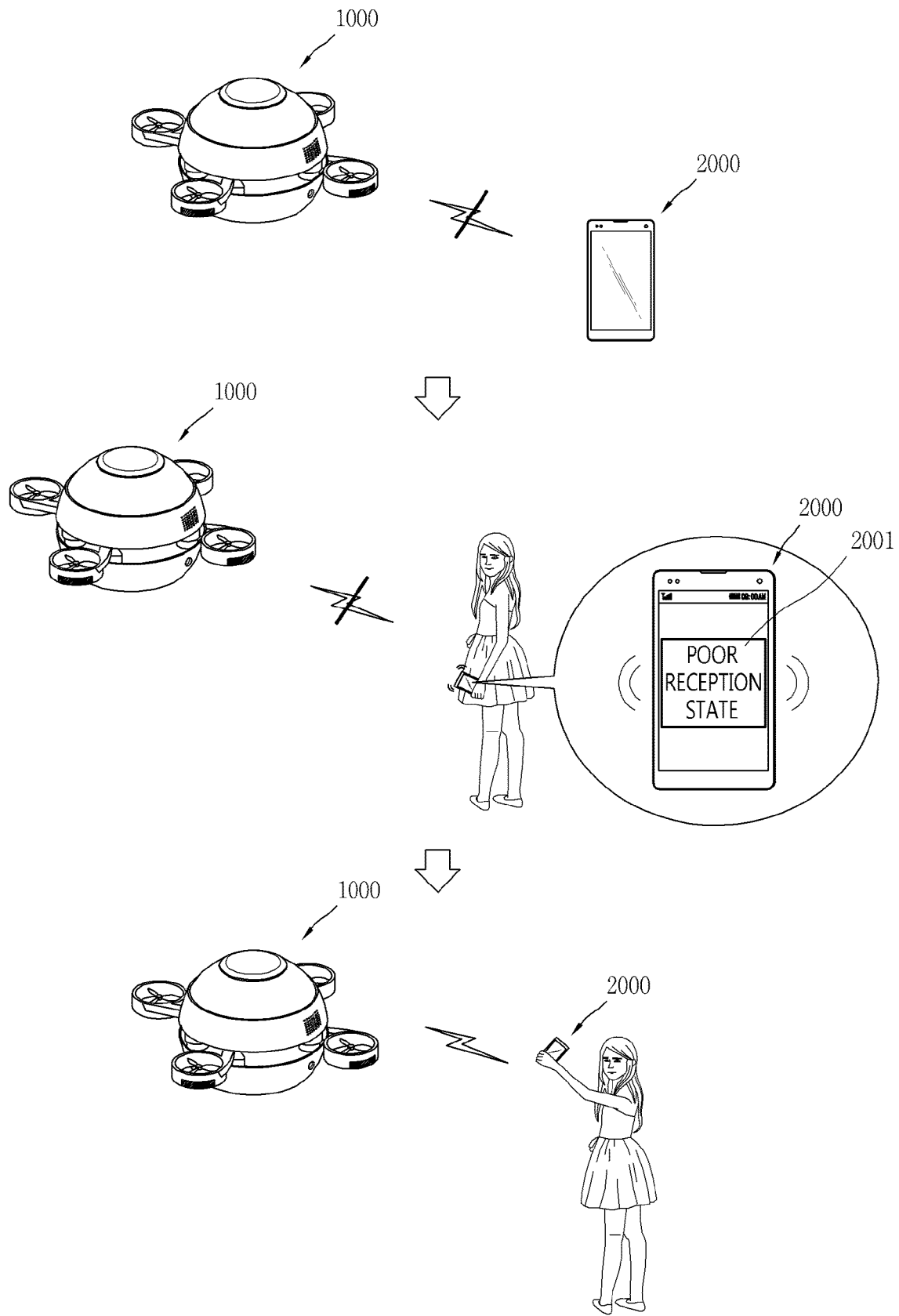

[Fig. 6c]
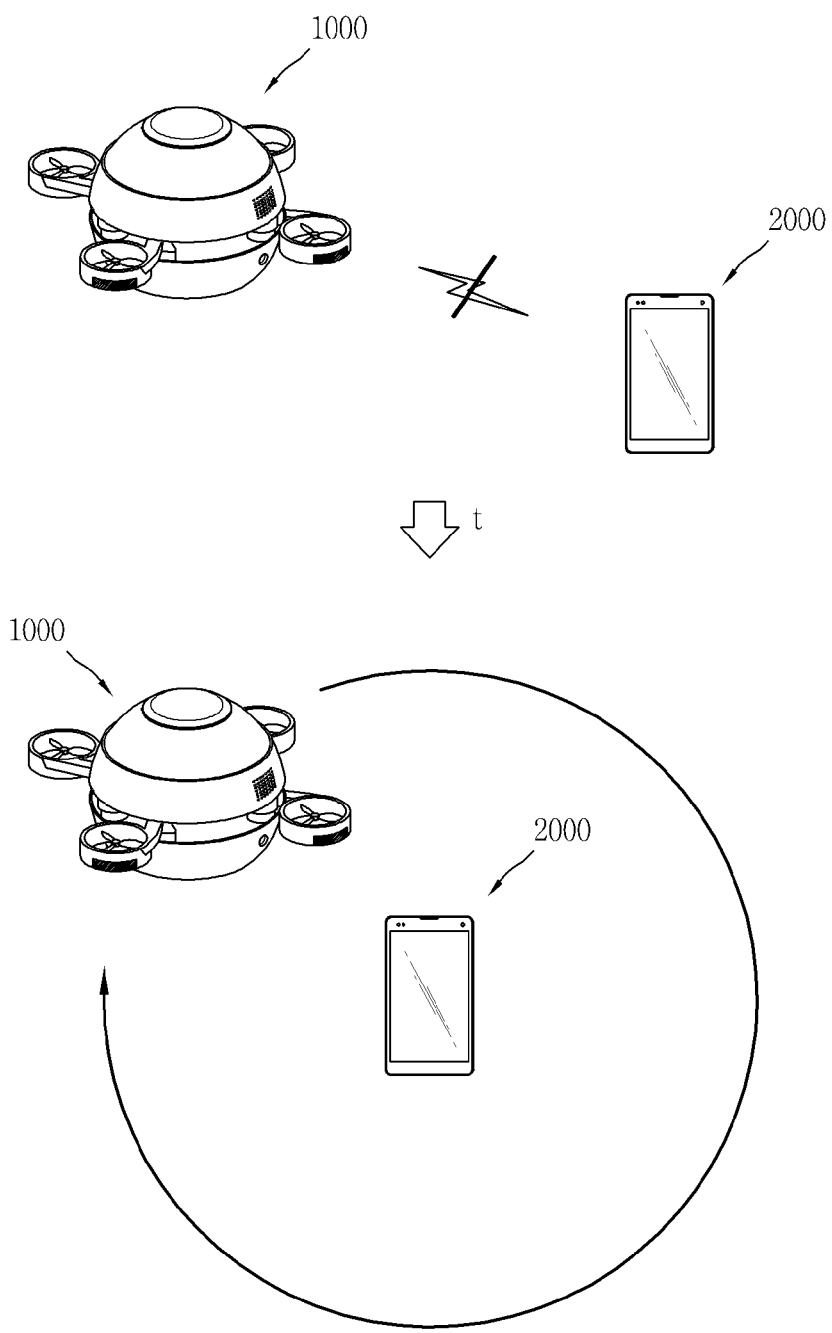

[Fig. 7a]
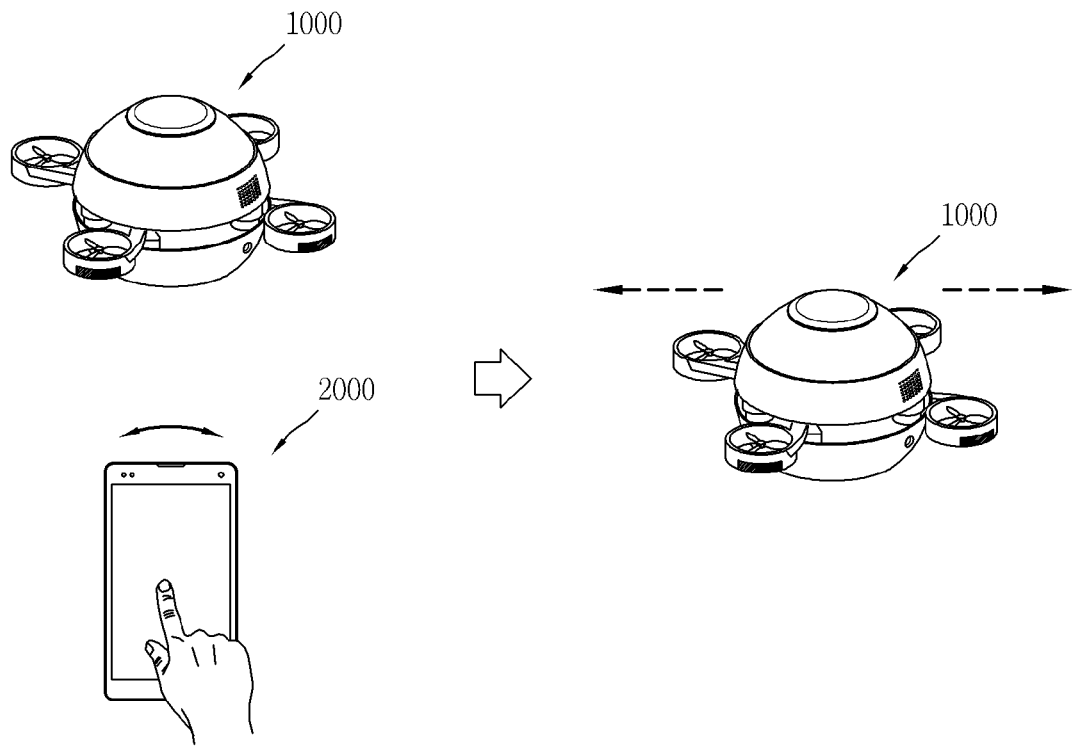
[Fig. 7b]
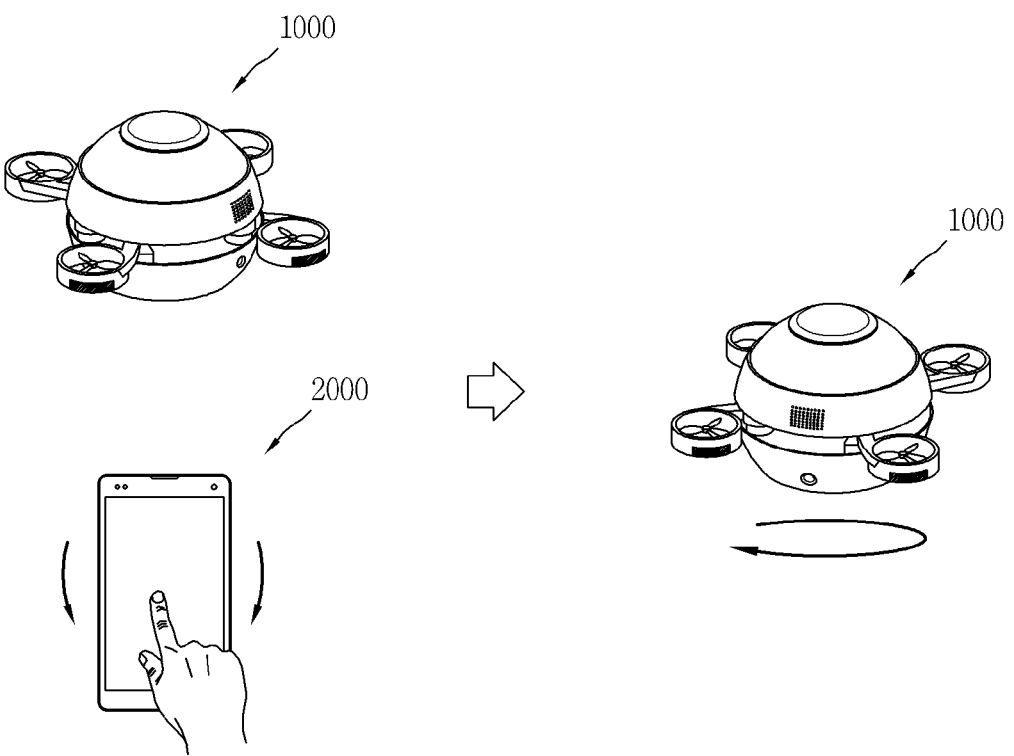

UNMANNED AIRCRAFT AND METHOD OF CONTROLLING THE SAME

CROSS REFERENCE TO RELATED APPLICATIONS

This application is the National Phase of PCT International Application No. PCT/KR2015/012325, filed on Nov. 17, 2015, which claims priority under 35 U.S.C. 119(a) to Patent Application No. 10-2015-0117551, filed in the Republic of Korea on Aug. 20, 2015, all of which are hereby expressly incorporated by reference into the present application.

TECHNICAL FIELD

The present invention relates to an unmanned aircraft that flies through the air.

BACKGROUND ART

An unmanned aircraft is an aircraft that does not need a runway. A small-sized relatively-lightweight main body of the unmanned aircraft is equipped with various functions such as transporting, photographing, and low-altitude searching. Recently, the unmanned aircraft has found applications in various fields. The unmanned aircraft can be remotely controlled in such a manner that the unmanned aircraft performs a function above a specific area.

Recently, the unmanned aircraft that flies above a specific area according to a user control command has been studied to find its application in an automotive field. As a typical example of this, the unmanned aircraft that, while in flight, performs a function of collecting information and providing information necessary for automotive driving has been developed.

The unmanned aircraft flies according to a control command that is input by a user. The user has the difficulty in controlling all of the flight direction, speed, and altitude of the unmanned aircraft that flies through the air.

DISCLOSURE OF INVENTION

Technical Problem

Therefore, an object of the present invention is to provide an unmanned aircraft that flies based on movement of an external device.

Solution to Problem

To achieve these and other advantages and in accordance with the purpose of the present invention, as embodied and broadly described herein, there is provided an unmanned aircraft including: a housing; a drive unit that is formed in such a manner that the housing is moved; multiple UWB communication modules that are arranged a distance away from one another and that receives a wireless signal from an external device; a sensor unit that detects movement of the housing; and a control unit that calculates a distance between the external device and the housing, using pieces of movement information which are output by the multiple UWB communication modules and the sensor unit, and that controls the drive unit in such a manner that a specific distance between the external device and the housing is maintained.

In the unmanned aircraft, the drive unit may include at least three propellers that are arranged a predetermined distance away from one another, and the multiple UWB communication modules may be arranged in at least one or more of the three propellers.

Accordingly, the multiple communication modules can be arranged in a part that is separated a maximum distance away from the housing.

In the unmanned aircraft, movement information of the external device may be received from the external device, and the distance between the external device and the housing may be calculated.

Accordingly, quality of an image that is captured by a camera is improved by making compensation for the more precise movement of the external device.

In the unmanned aircraft, in a case where reception quality of the wireless signal is poorer than reference quality, the controller may receive the movement information or may transmit warning information to the external device. Thus, the unmanned aircraft flies in a more stable manner.

Advantageous Effects of Invention

An unmanned aircraft according to the present invention flies while maintaining a predetermined distance to an external device. Thus, in a case where a user is on the move while carrying the external device, a control command does not have to be transmitted. In addition, although the user does not detect, with the naked eye, the external device that is on the move, the unmanned aircraft photographs the external device while flying as the external device moves. Thus, in a case where the unmanned aircraft is detected with the naked eye, it is possible to control the unmanned aircraft.

BRIEF DESCRIPTION OF DRAWINGS

FIG. 1A is a diagram illustrating an unmanned aircraft according to one embodiment of the present invention, when viewed from one direction;

FIG. 1B is a block diagram for describing a wireless communication between an external device and the unmanned aircraft;

FIG. 1C is a block diagram for describing a configuration of a first filter unit;

FIG. 2A is a flowchart for describing a control method according to one embodiment of the present invention.

FIG. 2B is a conceptual diagram for describing the control method in FIG. 2A;

FIG. 2C is a conceptual diagram for describing a control method in which the unmanned aircraft is rotated based on movement of the external device;

FIGS. 3A and 3B are conceptual diagrams for describing a control method of maintaining a distance between a camera and the unmanned aircraft, according to another embodiment;

FIG. 4A is a flowchart for describing a control method in which estimated location data is corrected based on the movement information, according to still another embodiment;

FIGS. 4B and 4C are conceptual diagrams for a control method of controlling the unmanned aircraft according to still another embodiment;

FIG. 5A is a flowchart for describing a method in which, in a case where a specific distance is maintained, the unmanned aircraft is controlled;

FIGS. 5B to 5D are conceptual diagrams for describing the control method in FIG. 5A according to various embodiments;

FIG. 6A to FIG. 6C are conceptual diagrams for describing a method in which the unmanned aircraft is controlled in a case where a communication state is poor; and FIGS. 7A and 7B are conceptual diagrams for describing a control method in which flight of the unmanned aircraft is controlled using the external device.

MODE FOR THE INVENTION

Figure 4B:
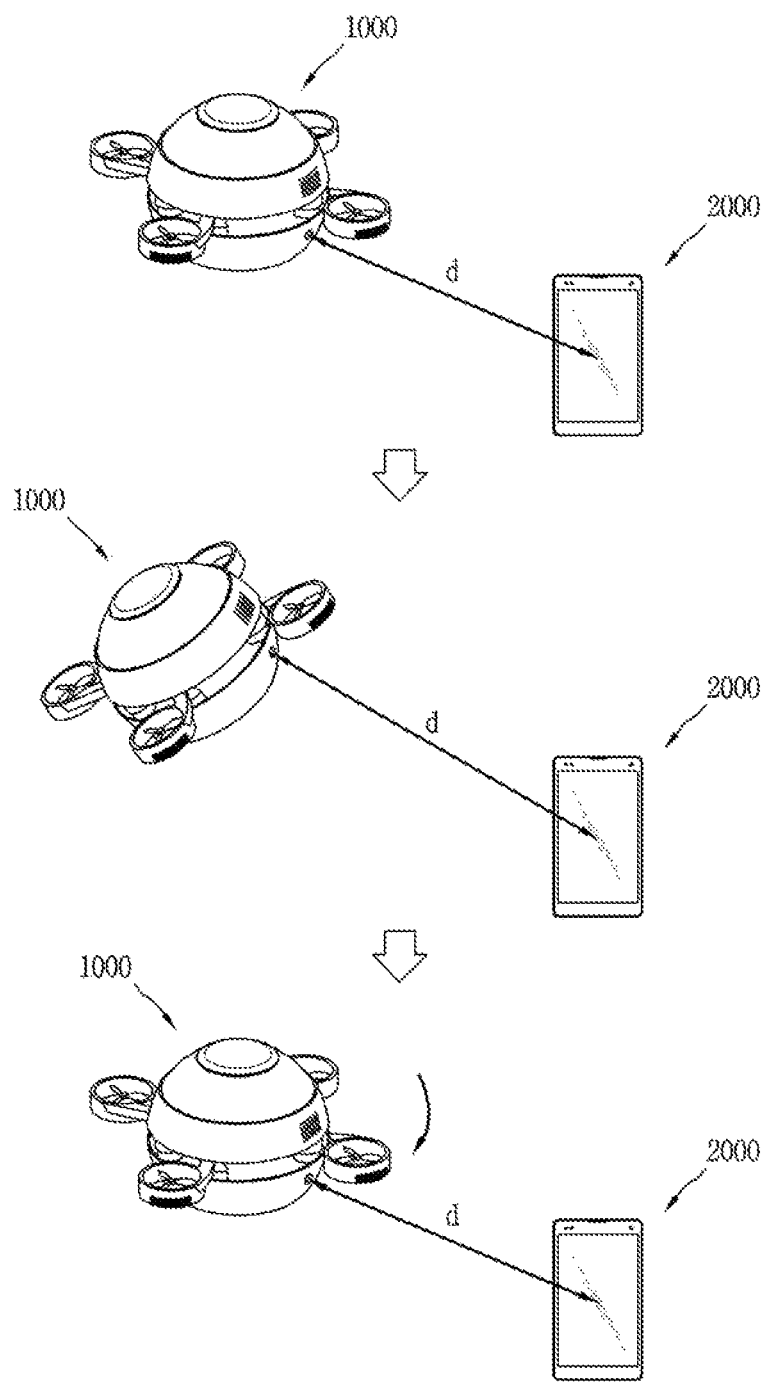

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

FIG. 1A is a diagram illustrating an unmanned aircraft according to one embodiment of the present invention, when viewed from one direction.

An unmanned aircraft 1000 according to the present invention is formed in a substantially spherical shape in an accommodation mode. The unmanned aircraft 1000 includes an upper case 1001, a lower case 1002, an upper lid 1003, an accommodation portion 1004, a lower lid (not illustrated), which make up an external appearance of the unmanned aircraft 1000. Thus, the unmanned aircraft 1000 has a space inside.

A solar heat charging unit 1192 is arranged between the upper case 1001 and the upper lid 1003. External surfaces of the upper case 1001, the lower case 1002, the upper lid 1003 and the solar heat charging unit 1192 are curved, and one part of the unmanned aircraft 1000 is spherical.

In addition, the upper case 1001 and the upper lid 1003 are formed in such a manner that the external surfaces of the upper case 1001 and the upper lid 1003 are successively curved. A drive unit 1210, the upper case 1001, and the lower case 1002 are formed in such a manner that one surface of the drive unit 1210, which is exposed to the outside, and the external surfaces of the upper case 1001, and the lower case 1002 are successively curved in a state where a drive unit 1210 is accommodated into the accommodation portion 1004.

The accommodation portion 1004 is formed between the upper case 1001 and the lower case 1002, and the drive unit 1210 is accommodated into the accommodation portion 1004. The drive unit 1210 is configured form multiple wing units. In the drawings, the drive unit 1210 is illustrated as including four wing units, but the number of wing units is not limited to 4.

The drive unit 1210 includes a propeller 1211, a main body 1212, which includes a holding unit 1212 b that holds the propeller 1211 in such a manner that the propeller 1211 is rotatable and a connection unit 1212 a that is connected to a body, and a drive shaft 1213 that connects the connection unit 1212 a to the main body 1212 in such a manner that the connection 1212 a is rotatable. One part of the main body 1212 and the upper and lower cases 1001 and 1002 are formed in such manner that an external surface of the one part of the main body 1212, which is exposed to the outside and the external surfaces of the upper and lower cases 1001 and 1002 are successively curved in the accommodation mode. In a case where the accommodation mode is changed to a flight mode, the drive shaft rotates the connection unit 1212 a in such a manner that the wing unit protrudes outward from the body and the holding unit 1212 b is arranged to the outside. In the flight mode, when the propeller 1211 rotates, the body flies.

The unmanned aircraft 1000 according to one embodiment of the present invention includes a first camera 1121a, a sound output unit 1122, a power supply unit (not illustrated), and the solar heat charging unit 1192.

The camera 1121a photographs the ground while the unmanned aircraft 1000 is in flight. The camera 1121a is fixed to the lower case 1002 in such a manner that the camera 1121a photographs an external environment at a constant angle.

A parachute unit is arranged over a second circuit board that is arranged on an internal frame which is arranged over first and second sound output units. The internal frame includes an accommodation space into which the parachute unit is accommodated. The accommodation space is covered by the upper lid 1003. The parachute unit is spread out based on a specific control command. When the parachute unit is spread out, the upper lid 1003 is separated from the unmanned aircraft 1000.

The power supply unit (not illustrated) is included that supplies power to the unmanned aircraft 1000. The power supply unit (not illustrated) is charged by the solar heat charring unit 1192 or a wireless charging unit (not illustrated).

The solar heat charging unit 1192 is charged while the unmanned aircraft 1000 is in flight, and with power that is supplied from the solar heat charging unit 1192, flight hours are secured. The solar heat charging unit 1192 converts light energy, which is introduced from the outside while the unmanned aircraft 1000 is in flight, into electrical energy.

The wireless charging unit that supplies power to the power supply (not illustrated) is arranged in the lower portion of the body.

The unmanned aircraft 1000 further includes a wireless communication unit that performs wireless communication with a predetermined external device 2000. The unmanned aircraft 1000 according to the present invention transmits and receives a wireless signal to and from the external device 2000, and measures a distance to the external device 2000. The external device 2000 here is an external device that performs wireless communication with the unmanned aircraft 1000. There is no limitation to a type of the external device 2000. For example, the external device 2000, as illustrated in the drawing, is a mobile terminal, or a wearable device that is formed in such a manner that the wearable device can be mounted on one portion of a user's body.

FIG. 1B is a block diagram for describing wireless communication between the external device and the unmanned aircraft. FIG. 1C is a block diagram for describing a configuration of a first filter unit.

The external device 2000 includes a sensor unit 2200 that detects movement of the external device 2000, a filter unit 2300 for movement information, and a UWB module 2100.

The sensor unit 2200 includes an acceleration sensor 2210, a gyro sensor 2220, and a terrestrial magnetism sensor 2230. However, the sensor unit 2200 is not limited to these sensors. A sensor module that is included in the sensor unit 2200 may be added or omitted.

The filter unit 2300 performs a processing step of filtering out noise or performing amplification in order to convert movement information that is collected by the sensor unit 2200 into a suitable electrical signal. The posture and movement of the external device 2000 are estimated by the sensor unit 2200 and the filter unit 2300.

The UWB module 2100 is formed in such a manner that a UWB packet that is received from the unmanned aircraft 1000 is transmitted back. Alternatively, the UWB module 2100 has a predetermined period, and transmits the UWB packet to the unmanned aircraft 1000. In this case, the external device 2000 transmits the motion information to the unmanned aircraft 1000 along with the UWB packet.

The unmanned aircraft 1000 includes a UWB module 1311 that receives the UWB packet, a first filter unit 1312 that filters the UWB packet, an inertial sensor 1411 that detects movement of the unmanned aircraft 1000, a second filter unit 1301 that outputs posture information and speed information according to an inertial signal and UWB packet information, and a location control unit 1421 and a posture control unit 1422 that control the unmanned aircraft 1000 base on the posture information the speed information.

Referring back to FIG. 1A, the unmanned aircraft 1000 includes multiple UWB modules 1310 and 1320. The unmanned aircraft 1000 desirably includes at least three UWB modules, and multiple UWB modules are arranged on the body of the unmanned aircraft 1000 in such a manner that the multiple UWB modules are positioned a maximum distance away from one another. For example, in a case where the unmanned aircraft 1000 includes four UWB modules, the four UWB modules are arranged in the four wing units of the drive unit 1210, respectively.

Accordingly, the different UWB modules that are arranged at different positions receives the UWB packet that is transmitted from the external device 2000, at different times. Based on a transmission speed of the UWB packet and information on a difference in the time when the UWB packet arrives at each of the multiple UWB modules, a distance between the external device 2000 and the unmanned aircraft 1000 is calculated. In addition, based on the difference in the time when the UWB packet arrives at each of the multiple UWB modules, a location at which the unmanned aircraft 1000 is arranged toward the external device 2000 is known.

The UWB packet is an ultra-wide band signal that can carry a large amount of digital data on a wide spectrum frequency at low power within a short-distance section. The UWB packet is configured as a pulse signal that is transmitted at intervals of specific time. Accordingly, although location information of each of the external device 2000 and the unmanned aircraft 1000 is not received indoors, a distance between the external device 2000 and the unmanned aircraft 1000 and relative locations of the external device 2000 and the unmanned aircraft 1000 are known. According to the present invention, a UWB tag is not positioned inside of UWB Access Points (APs) (the UWB module) and is positioned outside of the UWB APs, that is, in the external device 2000 to perform location recognition.

At least one location measurement algorithm among time of arrival (TOA), time difference of arrival (TDOA), and angle of arrival (AOA) is used to determine the relative location. The TOA is a scheme in which an arrival time of a transmission signal is measured and then a distance is calculated by multiplying the arrival time by a signal speed. The TDOA is a scheme in which a location is estimated through the use of a signal direction, time, and the like and a wireless network base station is used. The AOA is a scheme in which differences in reception angle between signals are used. As a hybrid scheme, there is an enhanced observed time difference (E-OTD) that specifies a difference between the time when the UWB packet is transmitted and the time when the UWB packet is transmitted back.

The first filter unit 1312 estimates a location from the UWB packet that is received from the external device 2000. The second filter unit 1310 performs a function of making compensation with the location that is estimated from the first filter unit 1312 and information on movement that occurs due to the inertial sensor 1411.

Referring to FIG. 1A, the first and second UWB modules 1310 and 1320 are arranged with the camera 1121a in between. In a case where the camera 1121a is controlled in such a manner that the camera 1121a photographs a user who has the external device 2000 with him/her, which direction the camera 1121a is currently arranged in is determined. That is, information on relative bearings of the unmanned aircraft 1000 with respect to the external device 2000 is calculated.

In a case where the camera 1121 a is arranged to face the external device 2000, the time it takes the UWB packet to arrive at the first and second UWB modules 1310 and the 1320 is measured as being shorter than the time it takes the UWB packet to arrive at the third and fourth UWB modules (not illustrated). Based on the time it takes the UWB packet to arrive at each of the UWB modules, a control unit issues a control command to control flight and rotation of the unmanned aircraft 1000.

Based on the motion information that is received from the external device 2000 along with the UWB packet, the control unit corrects a measured distance between the external device 2000 and the unmanned aircraft 1000. That is, in a case where an obstacle such as a human body or an external object blocks the line of sight of the external device 2000, a distortion due to this obstacle is compensated for based on the received movement information and the motion information of the unmanned aircraft.

Referring to FIG. 1C, the first filter unit is configured from a UWB location determination unit 1301a, a dynamic model 1301b, a location estimation model 1301c, and a switch (limit) 1301d. The UWB location determination unit 1301a calculates the location of the unmanned aircraft using a UWB location measurement algorithm. The dynamic model 1301b applies posture and movement estimation values, which are transmitted from a basic dynamics model for the movement of the external device 2000 and the external device 2000, to the calculated location. The location estimation model 1301c updates the dynamic model 1301b using a location value that is calculated with the UWB location measurement algorithm, and repeatedly performs this update until an optimum value is estimated. The switch 1301d is a filter for adjusting sensitivity of estimation, and is controlled from the outside.

An error value of a UWB location due to a difference in height is compensated for based on altitude information that is detected the altitude sensor 1412.

That is, when the external device 2000 and the unmanned aircraft 1000 are wirelessly connected to each other, the unmanned aircraft 1000 calculates a relative distance by applying the UWB packet which is transmitted and received to a specific algorithm. Accordingly, the unmanned aircraft 1000 measures a distance to the external device 2000 without location information of each of the unmanned aircraft 1000 and the external device 2000. In addition, distance information that is calculated by applying the external device 2000 and the unmanned aircraft 1000 is corrected and thus the relative locations of the unmanned aircraft 1000 and the external device 2000 are known in a more precise manner.

FIG. 2A is a flowchart for describing a control method according to one embodiment of the present invention. FIG. 2B is a conceptual diagram for describing the control method in FIG. 2A.

The unmanned aircraft 1000 receives a wireless signal from the external device 2000 (S210). Movement of the body of the unmanned aircraft 1000 is detected (S220), and estimated data on the location of each of the external device 2000 and the body of the unmanned aircraft 100 is output (S230).

The control unit calculates a distance between the external device 2000 and a housing using the estimated location data, and issues a flight control command in order for the calculated distance to be maintained (S240). The flight control command drives the drive unit 1210.

Referring to FIG. 2B, when the external device 2000 and the unmanned aircraft 1000 are wirelessly connected to each other, the control unit transmits and receives a wireless signal that is configured as the UWB packet with a predetermined period. The control unit calculates a distance d between the external device 2000 and the unmanned aircraft 1000. The distance d is corrected based on the movement information of each of the unmanned aircraft 1000 and the external device 2000.

The control unit sets an initial distance between the unmanned aircraft 1000 and the external device 2000 to a reference distance d. In addition, the reference distance d is set based on a user control command. The control measures the distance between the unmanned aircraft 1000 and the external device 2000 while the unmanned aircraft 1000 and the external device 2000 are in motion.

When the distance between the external device 2000 and the unmanned aircraft 1000 is changed, the control unit issues the flight control command to move the unmanned aircraft 1000 in order for the reference distance d to be maintained back. Although the user does not apply the flight control command additionally, the control unit controls the unmanned aircraft 1000 in such a manner that the unmanned aircraft 1000 moves as the external device 2000 moves. In this case, the control unit performs control in such a manner that the camera 1121a is activated and photographs the external device 2000.

According to the present embodiment, the unmanned aircraft 1000 flies while maintaining a predetermined distance to the external device 2000. Thus, in a case where the user is on the move while carrying the external device 2000, the control command does not have to be transmitted. In addition, although the user does not detect, with the naked eye, the external device 200 that is on the move, the unmanned aircraft 1000 photographs the external device 2000 while flying as the external device 200 moves. Thus, in a case where the unmanned aircraft 1000 is detected with the naked eye, it is possible to control the unmanned aircraft 1000.

Referring to FIG. 2C, a control method is described in which the unmanned aircraft 1000 is rotated based on the movement of the external device 2000. According to the present embodiment, the unmanned aircraft 1000 includes first to fourth UWB modules (W1, W2, W3, and W4), but the unmanned aircraft 1000 is not limited to these UWB modules and may include three or more UWB modules.

The first to fourth UWB modules (W1, W2, W3, and W4) transmit and receives first to fourth wireless signals (S1, S2, S3, and S4), respectively. The first to fourth wireless signals (S1, S2, S3, and S4) are transmitted and received from different locations, respectively, and include different pieces of tag information that indicate the first to fourth UWB modules (W1, W2, W3, and W4), respectively. The control unit measures the distance between each of the UWB modules and the external device 2000, and accordingly calculates information on bearings of the unmanned aircraft 1000 with respect to the external device 2000.

In addition, while the unmanned aircraft 1000 is in flight, in a case where the camera 1121a is arranged in the direction in which the external device 2000 is photographed, the control unit calculates the direction in which the camera of the unmanned aircraft 1000 performs photographing, with respect to the external device 2000.

When it is determined with the movement of the external device 2000 that the external device 2000 is not arranged in the photographing direction, the control unit moves the unmanned aircraft 1000.

For example, in a case where due to the movement of the external device 2000, the wireless signal S1 of the first UWB module that is the closest to the camera 1121a arrives late, that is, in a case where the distance between the first UWB module and the external device 2000 is increased, bearing information of each of the external device 2000 and the camera 1121a is determined as changed. This case is when the external device 2000 is moved while maintaining the reference distance to the unmanned aircraft 1000 or when the unmanned aircraft 1000 rotates about an internal rotation axis.

Although the distance between the external device 2000 and the unmanned aircraft 1000 is constantly maintained, in case where the direction in which the camera 1121a performs the photographing is changed with respect to the external device 2000, the control unit issues a flight control command to rotate or move the unmanned aircraft 1000.

According to the present embodiment, even in a case where, while the distance between the unmanned aircraft 1000 and the external device 2000 is maintained, the external device 2000 is located out of a photographing range of the camera 1121a, with multiple UWB packets, relative rotation (relative movement) of the unmanned aircraft 2000 is determined.

FIGS. 3A and 3B are conceptual diagrams for describing a control method of maintaining the distance between the camera 1121a and the unmanned aircraft 1000, according to another embodiment. The control unit sets a photographing mode for the external device 2000 (S310). The photographing mode here is a mode that is set to photograph a specific subject (the external device) while the unmanned aircraft 1000 flies as the external device 2000, or to photograph a specific subject (the external device) while the unmanned aircraft 1000 flies in a specific pattern.

For example, the photographing modes include a mode in which the external device 2000 is photographed while the unmanned aircraft 1000 flies around the external device 2000, a mode in which the external device 2000 is photographed while the unmanned aircraft 1000 precedes or follows the external device 2000, and a mode in which the external device 2000 is photographed while the unmanned aircraft 1000 flies above the external device 2000.

The control unit determines the distance between the external device 2000 and the camera 1121a based on the photographing mode (S320). For example, the control unit sets the distance between the external device 2000 and the camera 1121a to a fixed distance, sets a distance that varies from one section to another, set the distance between the camera 1121a and the external device 2000 in such a manner that the specific distance is changed based on the movement of the external device 2000 (S320).

The unmanned aircraft 1000 according to the present embodiment includes the first to fourth UWB modules, and the camera 1121a is arranged between the first and second UWB modules. Accordingly, the third UWB module is arranged to face the camera 1121a.

The control unit sets the distance between each of the first to fourth UWB modules and the external device 2000 according to the distance between the camera 1121 a and the external device 2000, which is set (S330). In a case where the distance between the external device 2000 and the camera 1121 a varies, the distance between each of the first to fourth UWB modules and the external device 2000 is changed.

Based on the movement and rotation of the external device 2000, the unmanned aircraft 1000 flies (S340). For example, in a case where the external device 2000 moves, the distance between each of the first to fourth UWB modules and the external device 2000 is changed. Referring to FIG. 3B, the distance between the first UWB module and the external device 2000 is increased and the distance between the second UWB module and the external device 2000 is decreased.

In this case, the external device 2000 is located out of the photographing range of the camera 1121a.

The control issues the control command in such a manner that the distance between the second UWB module and the external device 2000 is increased back and the distance between the first UWB module and the external device 2000 is decreased back. Accordingly, the external device 2000 is arranged back within the photographing range of the camera 1121a.

Although not illustrated in the drawings, in a case where a distance that the external device 2000 moves is shorter than a predetermined distance within a reference time, the control unit rotates the unmanned aircraft 1000. In a case where the distance that the external device 2000 moves is greater than a predetermined distance within the reference time, the control unit moves the unmanned aircraft 1000.

FIG. 4A is a flowchart for describing a control method in which the estimated location data is corrected based on the movement information, according to still another embodiment. FIGS. 4B and 4C are conceptual diagrams for a control method of controlling the unmanned aircraft 1000 according to still another embodiment.

Referring to FIGS. 4A and 4B, the control unit generates the movement information as a result of detecting movement of the housing of the unmanned aircraft 1000 (S410). The control unit corrects the estimated location data using the movement information (S420). At this point, the control unit includes the second filter unit 1301 that outputs the posture information and the speed information using the inertial signal and the UWB packet information.

Referring to FIG. 4C, the UWB module 1311 of the unmanned aircraft 1000 receives the movement information of the external device 2000 along with the UWB packet. The movement information includes the change in the altitude (H1) of the external device 2000.

When the movement information including the change in the distance between the external device 2000 and the housing and the change in the altitude is received, a flight control command to change the altitude (h1) of the unmanned aircraft 1000 is issued.

Accordingly, in a case where the altitude (H2) of the external device 2000 is changed, the flight altitude (h2) of the unmanned aircraft 1000 is changed as well. Accordingly, in a state where a photographing angle is not changed, the camera 1121 a of the unmanned aircraft 1000 photographs the external device 2000.

In a case where the housing of the unmanned aircraft 1000 moves minutely such as when the housing rotates, because a change in the distance between the housing the external device 2000 is very small, it is not determined that the change in the distance occurs. However, in a case where, based on the movement information, the estimated location data is changed, the unmanned aircraft 1000 is controlled minutely based on this fact. Particularly, in a case where the external device 2000 is photographed with the camera 1121a, the external device 2000 is not photographed based on the minute movement. The camera 1121a is controlled that the camera 1121a stably photographs a desired area using the movement information.

FIG. 4C is a conceptual diagram for describing a method in which the unmanned aircraft 1000 is controlled based on a change in the altitude of the external device 2000.

Referring to FIG. 4C, the UWB module 1311 of the unmanned aircraft 1000 receives the movement information of the external device 2000 along with the UWB packet. The movement information includes the change in the altitude of the external device 2000.

When the movement information including the change in the distance between the external device 2000 and the housing and the change in the altitude is received, a flight control command to change the altitude of the unmanned aircraft 1000 is issued.

Accordingly, in a case where the altitude of the external device 2000 is changed, the flight altitude of the unmanned aircraft 1000 is changed as well. Accordingly, in a state where a photographing angle is not changed, the camera 1121a of the unmanned aircraft 1000 photographs the external device 2000.

FIG. 5A is a flowchart for describing a method in which, in a case where a specific distance is maintained, the unmanned aircraft 1000 is controlled. FIGS. 5B to 5D are conceptual diagrams for describing the control method in FIG. 5A according to various embodiments.

Referring to FIGS. 5A and 5B, the control unit detects the change in the distance between the external device 2000 and the unmanned aircraft 1000 (S510). When the change in the distance between the external device 2000 and the unmanned aircraft 1000 is detected, the control unit controls the unmanned aircraft 2000 in such a manner that the specific distance is maintained (S530).

On the other hand, when the change in the distance is not detected, the control unit receives the movement information from the external device 2000 (S520). For example, in a case where the change in the distance is not detected for a predetermined time t, the control unit receives the movement information. The unmanned aircraft 1000 maintains a stationary state for the predetermined time t.

Based on the motion information, the control unit moves the unmanned aircraft 1000 (S540). Referring to FIG. 5B, the control unit receives the movement information indicating that the external device 2000 rotates about a specific reference axis. The reference axis is set to be in the inside of the external device 2000, but is not limited to this.

In this case, the control unit controls the unmanned aircraft 1000 in such a manner that the unmanned aircraft 1000 rotates in substantially the same direction as the external device 2000.

According to the present embodiment, the camera 1121*a* of the unmanned aircraft 1000 is controlled in such a manner that the camera 1121*a* photographs the external device 2000 in one direction.

On the other hand, the movement information includes information indicating that the external device 2000 rotates with respect to the unmanned aircraft 1000. In this case, the control unit performs control in such a manner that the unmanned aircraft 1000 rotates about an internal reference axis of the housing, using the movement information.

Accordingly, the unmanned aircraft detects the movement of the external device 2000, which occurs without the change in the distance, and, according to the movement, photographs the external device (or a specific photographic subject) 2000 with the camera 1121*a*.

Referring to FIG. 5C, in a state where a specific mode is activated, the control unit detects the change in the distance between the external 2000 and the unmanned aircraft 1000. In a case where the change in the distance is not detected for the predetermined time t, the control unit issues a flight control command for the unmanned aircraft 1000 to rotate around the external device 2000.

Although not illustrated in detail, control commands for rotation radius, rotation speed, and rotational direction are issued based on a user setting.

In addition, in this case, the unmanned aircraft 1000 rotates as well in order for the camera 1121*a* to face the external device 2000.

While the external device 2000 rotates, the control unit also controls the unmanned aircraft 1000 in order for the distance between the external device 2000 and the unmanned aircraft 1000 to be maintained.

In this case, when the change in the distance due to the movement of the external device 2000 is detected, the control unit issues the flight control command to maintain the specific distance.

According to the present embodiment, the unmanned aircraft 1000 is described as rotating around the external device 2000 in a case where the external device 2000 maintains the stationary state, but a flight pattern of the unmanned aircraft 1000 is not limited to this. For example, the unmanned aircraft 1000 is controlled in such a manner that the altitude of the unmanned aircraft 1000 is changed to be in a state of photographing the external device 2000 or the unmanned aircraft 1000 rotates about the internal reference axis of the housing.

Referring to FIG. 5D, the control unit issues the flight control command for moving the unmanned aircraft 1000 based on the movement information. For example, in a case where the external device 2000 moves in a specific pattern, the control unit issues the flight control command for the unmanned aircraft 1000 to move in a corresponding pattern, using the movement information indicating the specific pattern.

FIG. 6A to FIG. 6C are conceptual diagrams for describing a method in which the unmanned aircraft 1000 is controlled in a case where a communication state is poor.

Referring to FIG. 6A, the control unit detects reception quality of the wireless signal (S610). When the unmanned aircraft 1000 and the external device 2000 are wirelessly connected to each other, the control unit detects wireless communication quality at intervals of predetermined time.

In a case where the quality is poorer than a predetermined reference quality, a GPS module is activated and the movement information of the external device 2000 is received (S620). For example, in a case where there is an obstacle between the unmanned aircraft 1000 and the external device 2000, the reception quality of the wireless signal is degraded. In a case where the user who has the external device 2000 with him/her enters into a building, the reception quality, for example, of a watch-type terminal is degraded due to movement of the user's body.

The control unit detects the location of the external device 2000 using the GPS module. When the location information and the movement information of the external device 2000 are received, the control unit issues the flight control command for the unmanned aircraft 1000 to approach the external device 2000 (S630). The location information and the movement information are transmitted using a wireless communication module instead of the UWB module.

In a case where the detected quality is poorer than the reference quality, the control unit activates a specific wireless communication module, and transmits a signal that requests the external device 2000 to transmit the location information and the movement information.

In a case where the degradation of the quality arises from a problem with the external device 2000, based on the request signal, the external device 2000 performs a specific function of solving the degradation of the quality. In addition, the location information and the movement information are transmitted to the unmanned aircraft 1000.

Referring to FIG. 6B, when the wireless communication quality is degraded, the unmanned aircraft 1000 transmits warning information 2001 to the external device 2000. The external device 2000 outputs the warning information. The warning information is one among visual data, audio data and vibration data. With the warning information that is output from the external device 2000, the user can solve a problem of the degradation of the quality by moving the external device 2000. For example, in a case where the external device 2000 is the watch-type terminal, when the user puts his/her hand into his/her pocket and the like, the problem of the degradation of the quality occurs. In this case, when the warning information is output in the form of vibration, the user who feels the vibration can improve the communication quality by pulling his/her hand out of his/her pocket.

That is, the problem of the degradation of the quality can be prevented from occurring due to the external device 2000.

Referring to FIG. 6C, in a case where the wireless communication quality is poorer than a predetermined reference quality for the predetermined time t, the control unit issues the flight control command for the unmanned aircraft 1000 to rotate around the external device 2000. At this point, the unmanned aircraft 1000 rotates around the external device 2000 of which the location is last received.

In addition, the control unit issues the flight control command for the unmanned aircraft 1000 to rotate about the internal reference axis of the unmanned aircraft 1000.

Although not illustrated in the drawings, in a case where, while the unmanned aircraft 1000 is in flight or in rotation, the external device 2000 is detected with the camera 1121*a*, the control unit issues the flight control command for the unmanned aircraft 1000 to approach the external device 2000.

According to the present embodiment, information on poor wireless communication is transmitted to the outside or a predetermined flight control command is issued in a state of the poor wireless communication. Thus, the unmanned aircraft is enabled to fly without improving a communication state or applying a control command. Accordingly, a problem can be minimized that occurs due to the poor wireless communication in a state where the user does not detect the unmanned aircraft 1000 with the naked eye.

FIGS. 7A and 7B are conceptual diagrams for describing a control method in which the flight of the unmanned aircraft 1000 is controlled using the external device 2000.

Referring to FIGS. 7A and 7B, the external device 2000 further includes a specific user input unit that receives a control command. The user input unit is realized as a touch sensor, a button, or the like, but is not limited to these.

In a case where the control command is not received, based on the distance between the unmanned aircraft 1000 and the external device 2000, the unmanned aircraft 1000 controls the flight of the unmanned aircraft 1000.

However, in a case where a specific control command that is applied to the external device 2000 is received in the unmanned aircraft 1000, the control unit issues the flight control command for the unmanned aircraft 1000 to fly in a flight pattern corresponding to a movement pattern of the external device 2000.

For example, in a state where the control command is applied (or after the control command is applied), in a case where the external device 2000 moves horizontally, the unmanned aircraft 1000 flies horizontally as well. In addition, in a state where the control command is applied (or after the control command is applied), in a case where the external device 2000 rotates, the unmanned aircraft 1000 is controlled in such a manner that the unmanned aircraft 1000 rotates according to the direction in which the external device 2000 rotates and the extent to which the external device 2000 rotates.

In this case, the control unit also issues the flight control command based on the distance between the body of the unmanned aircraft 1000 and the external device 2000, and the motion information of each of the unmanned aircraft 1000 and the external device 2000.

That is, the user can control the flight of the unmanned aircraft 1000 using the external device 2000. According to the present embodiments, a control method in which an unmanned aircraft is controlled precisely using a UWB packet can be applied to various industry fields. The configuration and the method of the embodiments according to the present invention, described above, are not applied in a limiting manner, but all of or some of the embodiments may be selectively combined with each other to create various modifications to the embodiments. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

INDUSTRIAL APPLICABILITY

According to the present embodiments, a control method in which an unmanned aircraft is controlled precisely using a UWB packet can be applied to various industry fields.

The invention claimed is:

1. An unmanned aircraft comprising:
   a housing;
   a drive unit that is formed in such a manner that the housing is moved;
   multiple ultra-wideband (UWB) communication modules that are arranged a distance away from one another and that receive a wireless signal from an external device;
   a sensor unit that detects movement of the housing; and
   a control unit that calculates a distance between the external device and the housing, using pieces of movement information which are output by the multiple UWB communication modules and the sensor unit, and that controls the drive unit in such a manner that a specific distance between the external device and the housing is maintained,
   wherein, in a situation where a reception quality of the wireless signal is poorer than a reference quality, the control unit transmits warning information to the external device.

2. The unmanned aircraft of claim 1, wherein the distance between the external device and the housing is calculated using at least one scheme among time of arrival (TOA), time difference of arrival (TDOA), and angle of arrival (AOA).

3. The unmanned aircraft of claim 2, wherein the drive unit includes at least three propellers that are arranged a predetermined distance away from one another, and
   wherein the multiple UWB communication modules are arranged near at least one or more of the three propellers.

4. The unmanned aircraft of claim 3, further comprising:
   a camera that is arranged adjacent to one of the multiple UWB communication modules,
   wherein, based on a distance between each of the multiple UWB communication modules and the external device, the control unit controls the drive unit in such a manner that a photographing range of the camera is maintained with respect to the external device.

5. The unmanned aircraft of claim 4, wherein the control unit controls the drive unit in such a manner that the camera in the housing is positioned the closest to the external device, using the distance between each of the multiple UWB communication modules and the external device.

6. The unmanned aircraft of claim 1, wherein movement information of the external device is received from the external device, and the distance between the external device and the housing is calculated.

7. The unmanned aircraft of claim 6, wherein, in a situation where the distance between the external device and the housing is constant for a predetermined time, the control unit receives the movement information of the external device.

8. The unmanned aircraft of claim 7, wherein, based on the movement information, the control unit controls the drive unit in such a manner that the housing rotates in a state where the distance between the external device and the housing is maintained.

9. The unmanned aircraft of claim 7, wherein, in the situation where the reception quality of the wireless signal is poorer than the reference quality, the control unit receives the movement information.

10. The unmanned aircraft of claim 7, wherein the movement information includes information about a change in altitude, and
    wherein, based on the movement information, the control unit controls the drive unit in such a manner that the change in the altitude of the housing is changed.

11. The unmanned aircraft of claim 1, wherein, in the situation where the reception quality of the wireless signal is poorer than the reference quality, the control unit receives location information from the external device, and based on the location information of the external device, controls the drive unit in such a manner that the unmanned aircraft rotates around the external device.

12. The unmanned aircraft of claim 1, wherein, in a situation where a specific control command is received from the external device, the control unit controls the drive unit in such a manner that the unmanned aircraft flies in a flight pattern corresponding to a movement pattern of the external device.

13. A method of controlling an unmanned aircraft that includes a housing and a drive unit that is arranged in such a manner as to move the housing, the method comprising:
   receiving a wireless signal from an external device using multiple ultra-wideband (UWB)-communication modules;
   detecting movement of the housing;
   calculating a distance between the external device and the housing using movement information output by the multiple UWB communication modules;
   controlling the drive unit in such a manner that a specific distance between the external device and the housing is maintained; and
   transmitting warning information to the external device in a situation where a reception quality of the wireless signal is poorer than a reference quality.

14. The method of claim 13, wherein the distance between the external device and the housing is calculated using at least one scheme among time of arrival (TOA), time difference of arrival (TDOA), and angle of arrival (AOA).

* * * * *